United States Patent
Park

(10) Patent No.: US 12,445,547 B2
(45) Date of Patent: Oct. 14, 2025

(54) ELECTRONIC DEVICE INCLUDING DISPLAY MODULE HAVING MULTIPLE FPCBs

(71) Applicant: Samsung Electronics Co., Ltd., Suwon-si (KR)

(72) Inventor: Daeseung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 18/180,508

(22) Filed: Mar. 8, 2023

(65) Prior Publication Data
US 2023/0224396 A1    Jul. 13, 2023

Related U.S. Application Data

(63) Continuation of application No. PCT/KR2021/012627, filed on Sep. 15, 2021.

(30) Foreign Application Priority Data

Sep. 15, 2020   (KR) .......... 10-2020-0118523

(51) Int. Cl.
*H04M 1/02* (2006.01)
*H05K 1/14* (2006.01)

(52) U.S. Cl.
CPC ....... *H04M 1/0277* (2013.01); *H04M 1/0262* (2013.01); *H04M 1/0266* (2013.01); *H04M 1/0274* (2013.01); *H05K 1/147* (2013.01)

(58) Field of Classification Search
CPC ............ H04M 1/0277; H04M 1/0262; H04M 1/0266; H04M 1/0274; H05K 1/147
See application file for complete search history.

(56) References Cited

U.S. PATENT DOCUMENTS 9,992,862 B2    6/2018   Shin et al.
10,097,245 B2 * 10/2018   Kim .................. G06F 1/1626
(Continued)

FOREIGN PATENT DOCUMENTS

CN    107959735 A    4/2018
CN    109831551 A    5/2019
(Continued)

OTHER PUBLICATIONS

Extended European Search Report dated Jan. 3, 2024, issued in European Application No. 21869723.3-1224.
(Continued)

*Primary Examiner* — James Wu
(74) *Attorney, Agent, or Firm* — Jefferson IP Law, LLP

(57) ABSTRACT

An electronic device is provided. The electronic device includes a frame, a first partition wall protruding from the frame in a first direction and dividing the frame into a first area and a second area, a second partition wall portion protruding from the frame in the first direction and dividing the frame into a second area and a third area, a first printed circuit board disposed in the first area, a battery disposed in the second area, a second printed circuit board disposed in the third area, and a display circuit including at least two flexible printed circuit boards. The flexible printed circuit boards include an overlapping area in which at least some areas overlap, the overlapping area being disposed in the second area, and, in the frame, an opening is formed in a portion facing the overlapping area.

20 Claims, 11 Drawing Sheets

(56) References Cited

U.S. PATENT DOCUMENTS

| | | |
|---|---|---|
| 10,187,974 B2 | 1/2019 | Qian |
| 11,100,351 B2 | 8/2021 | Im et al. |
| 2015/0043142 A1 | 2/2015 | Jang et al. |
| 2016/0198560 A1 | 7/2016 | Shin et al. |
| 2018/0110141 A1 | 4/2018 | Lee |
| 2019/0041909 A1 | 2/2019 | Pakula et al. |
| 2019/0373729 A1 | 12/2019 | Park et al. |
| 2020/0004295 A1 | 1/2020 | Paek et al. |
| 2020/0042125 A1 | 2/2020 | Lee et al. |
| 2020/0042131 A1* | 2/2020 | Lee ................... G06F 1/1643 |
| 2020/0120193 A1 | 4/2020 | Ha et al. |
| 2020/0127404 A1 | 4/2020 | Seo et al. |
| 2020/0192431 A1 | 6/2020 | Shin et al. |
| 2020/0220227 A1* | 7/2020 | Kwak ................. H01M 50/287 |
| 2021/0084764 A1 | 3/2021 | Yang et al. |
| 2021/0185809 A1 | 6/2021 | Park |
| 2021/0351461 A1 | 11/2021 | Yang et al. |

FOREIGN PATENT DOCUMENTS

| | | |
|---|---|---|
| CN | 110149762 A | 8/2019 |
| JP | 2015-015545 A | 1/2015 |
| KR | 10-2016-0085388 A | 7/2016 |
| KR | 10-2019-0087216 A | 7/2019 |
| KR | 10-2019-0135811 A | 12/2019 |
| KR | 10-2020-0002576 A | 1/2020 |
| KR | 10-2020-0014467 A | 2/2020 |
| KR | 10-2020-0014951 A | 2/2020 |
| KR | 10-2020-0017291 A | 2/2020 |

OTHER PUBLICATIONS

Indian Office Action dated Aug. 9, 2024, issued in Indian Application No. 202317016821.
Korean Office Action dated Nov. 11, 2024, issued in Korean Application No. 10-2020-0118523.
Chinese Office Action dated Mar. 29, 2025, issued in Chinese Application No. 202180062921.9.

* cited by examiner

ELECTRONIC DEVICE INCLUDING DISPLAY MODULE HAVING MULTIPLE FPCBs

CROSS-REFERENCE TO RELATED APPLICATION(S)

This application is a continuation application, claiming priority under § 365(c), of an International application No. PCT/KR2021/012627, filed on Sep. 15, 2021, which is based on and claims the benefit of a Korean patent application number 10-2020-0118523, filed on Sep. 15, 2020, in the Korean Intellectual Property Office, the disclosure of which is incorporated by reference herein in its entirety.

BACKGROUND

1. Field

The disclosure relates to an electronic device including a display module having a plurality of flexible printed circuit boards (FPCBs).

2. Description of Related Art

A display module including a touch screen configured to perform a touch function may include a plurality of flexible printed circuit boards having a flexible printed circuit board connected to the touch screen.

Depending on the type of display module, a display driver integrated circuit (DDIC) configured to drive the display may be disposed on one of a plurality of flexible printed circuit boards. In order to implement a display that responds at high speed, the area of the flexible printed circuit board on which the DDIC is disposed may also increase. Because of this, the position of the area where the plurality of flexible printed circuit boards overlaps each other may be changed.

On the other hand, as electronic devices are miniaturized and their thicknesses gradually become thinner, the internal spaces of electronic devices are also becoming narrower.

The above information is presented as background information only to assist with an understanding of the disclosure. No determination has been made, and no assertion is made, as to whether any of the above might be applicable as prior art with regard to the disclosure.

SUMMARY

In order to fix a battery disposed inside an electronic device to its original position, a mechanism for fixing the battery may exist. This mechanism may serve to stably fix the battery in its original position even when an external impact is applied to the electronic device.

As the size of a plurality of flexible printed circuit boards included in a display module increases, interference may occur between an area where the plurality of flexible printed circuit boards overlaps and the mechanism for fixing the battery.

In order to avoid this interference, a method of partially deforming the mechanism for fixing the battery may be used, but in this case, a problem in which the battery becomes vulnerable to impact may occur.

Aspects of the disclosure are to address at least the above-mentioned problems and/or disadvantages and to provide at least the advantages described below. Accordingly, an aspect of the disclosure is to provide an electronic device which can avoid interference between an area where a plurality of flexible printed circuit boards included in a display module overlap and a mechanism for fixing a battery without deformation of the mechanism for fixing the battery, and include a structure capable of maintaining a thickness of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a frame, a first partition wall formed so as to protrude from the frame in a first direction and dividing the frame into a first area and a second area, a second partition wall portion formed so as to protrude from the frame in the first direction and dividing the frame into the second area and a third area, a first printed circuit board disposed in the first area of the frame, a battery disposed in the second area of the frame, a second printed circuit board disposed in the third area of the frame, and a display module including at least two flexible printed circuit boards and disposed on the frame in a second direction opposite to the first direction, wherein the flexible printed circuit boards of the display module may include an overlapping area in which at least some areas are overlapped, the overlapping area may be disposed in the second area spaced apart from the first partition wall portion, and in the frame, an opening may be formed in a portion facing the overlapping area of the flexible printed circuit boards of the display module.

In accordance with another aspect of the disclosure, an electronic device is provided. The electronic device includes a frame, a first partition wall formed so as to protrude from the frame in a first direction and dividing the frame into a first area and a second area, a first printed circuit board disposed on the first area of the frame, a battery disposed on the second area of the frame, and a display module including at least two flexible printed circuit boards and disposed on the frame in a second direction opposite to the first direction, wherein the flexible printed circuit boards of the display module may include an overlapping area in which at least some areas are overlapped, the overlapping area may be disposed in the second area spaced apart from the first partition wall portion, and in the frame, an opening may be formed in a portion facing the overlapping area of the flexible printed circuit boards of the display module.

According to various embodiments of the disclosure, interference between a mechanism for fixing a battery and an area where a plurality of flexible printed circuit boards included in a display module overlap may be avoided. In addition, it is possible to solve the problem of increasing the thickness of the electronic device due to the overlapping of the plurality of flexible printed circuit boards.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly indicates otherwise. Thus, for example, reference to "a component surface" includes reference to one or more of such surfaces.

As used herein, each of such phrases as "A or B," "at least one of A and B," "at least one of A or B," "A, B, or C," "at least one of A, B, and C," and "at least one of A, B, or C," may include any one or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if a component (e.g., a first component) is referred to, with or without the term "operatively" or "communicatively," as "coupled with," "coupled to," "connected with," or "connected to" another element (e.g., a second component), it denotes that the component may be coupled with the other component directly (e.g., wiredly), wirelessly, or via a third component.

Figure 1:
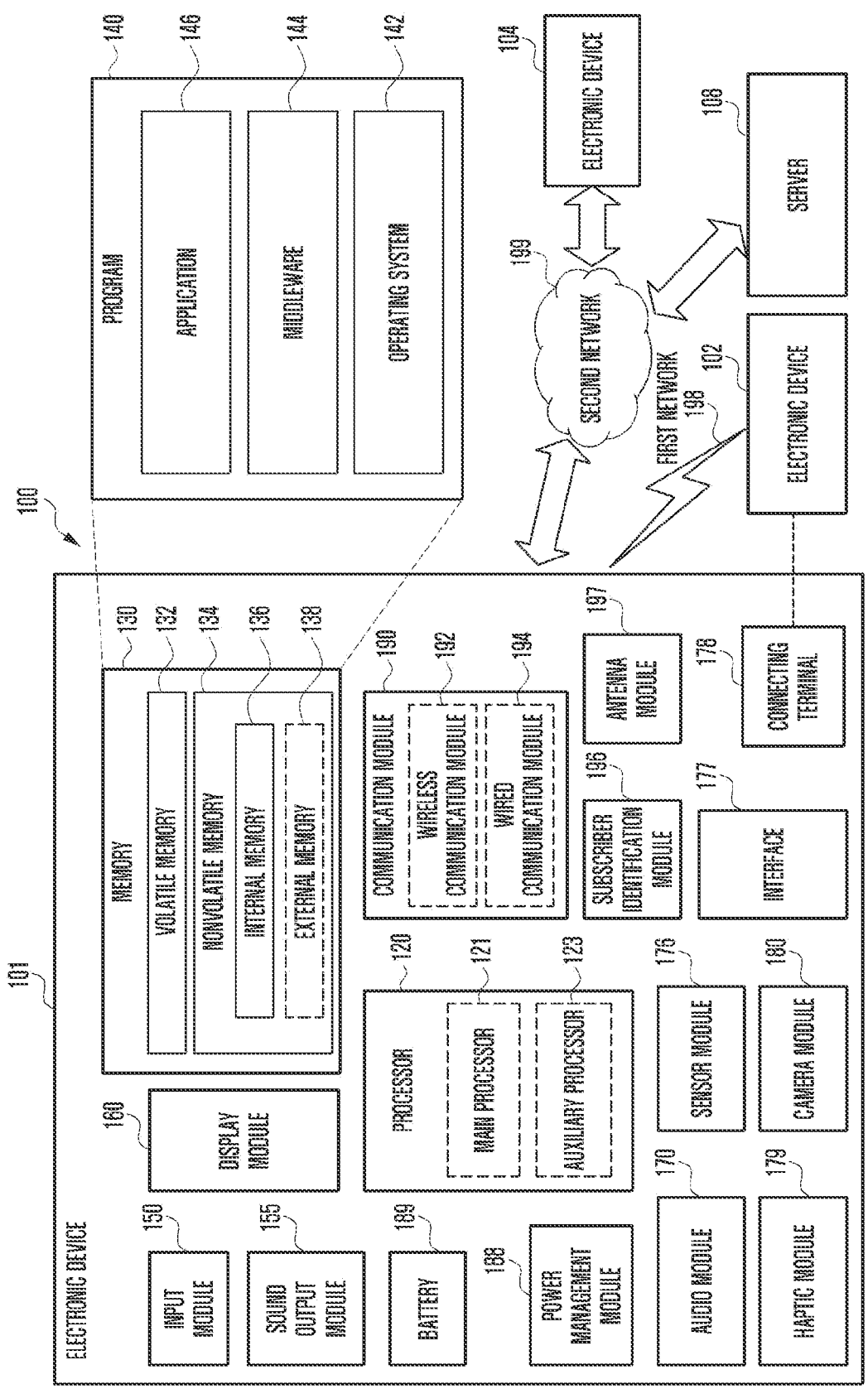
FIG. 1 is a block view of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., electronic device 102, electronic device 104, or server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and a next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., electronic device 104), or a network system (e.g., second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
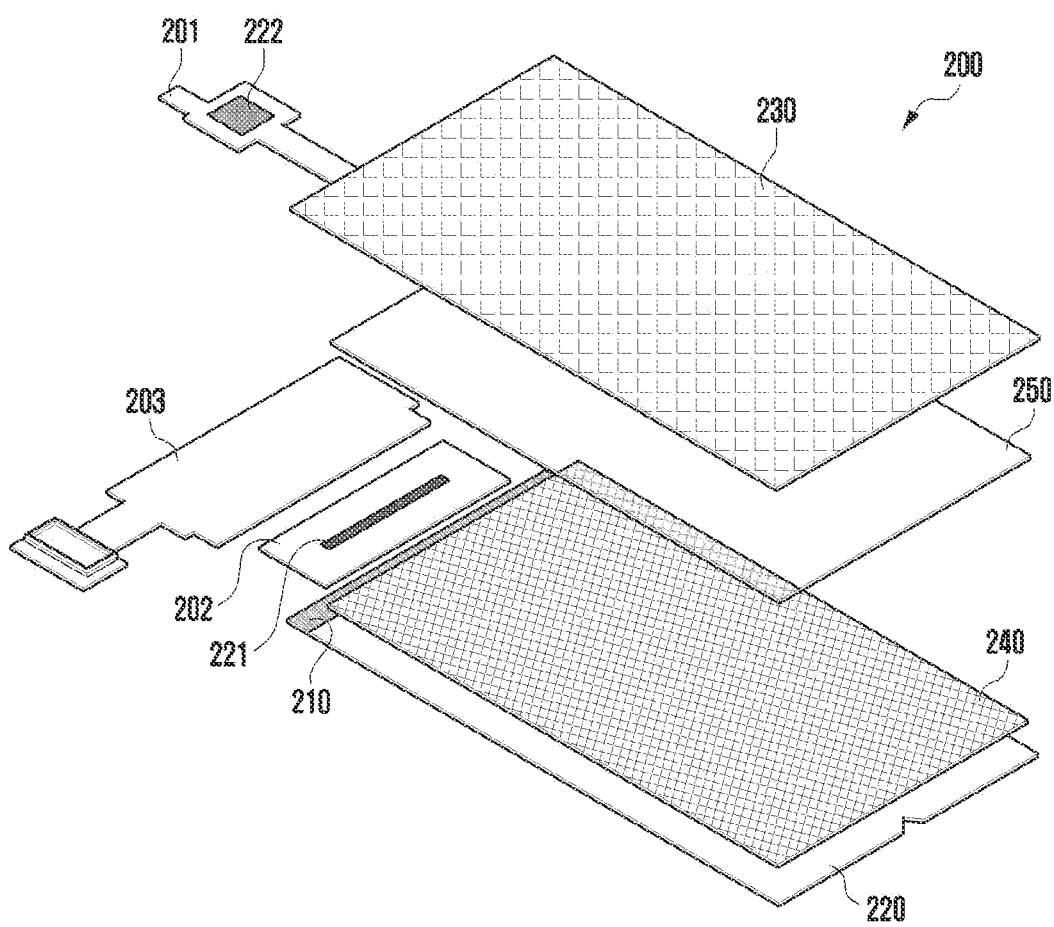
FIG. 2 is an exploded perspective view of a display module according to an embodiment of the disclosure.

FIG. 2 is an exploded perspective view of a display module according to an embodiment of the disclosure.

An electronic device (e.g., electronic device 101 in FIG. 1) having a structure according to various embodiments of the disclosure may include various types of display modules (e.g., display module 160 in FIG. 1) having a plurality of flexible printed circuit boards (FPCBs). For example, a display module referred to in this disclosure may be a display module having a structure such as chips on glass (COG), chips on film (COF), and chips on plastic (COP). Here, the COG may refer to a display module having a structure in which a panel and a display driver IC (DDIC) are disposed on a substrate made of glass material. The COF may refer to a display module having a structure in which a panel is disposed on a substrate made of a glass material or a flexible material (e.g., polyimide), and a DDIC is disposed on a flexible printed circuit board. The COP may refer to a display module having a structure in which a panel and a DDIC are disposed on a substrate made of a flexible material.

Such a display module may include a plurality of flexible printed circuit boards (e.g., flexible printed circuit boards 201, 202, and 203 in FIG. 2). A plurality of flexible printed circuit boards included in the display module may include a flexible printed circuit board (e.g., flexible printed circuit board 201 in FIG. 2) connected to a touch screen (e.g., touch screen 230 in FIG. 2), a flexible printed circuit board (e.g., flexible printed circuit board 202 in FIG. 2) connected to a panel (e.g., panel 220 in FIG. 2), and a flexible printed circuit board (e.g., flexible printed circuit board 203 in FIG. 2) connected to a printed circuit board of an electronic device. Hereinafter, a display module 200 having a COF structure will be described as a representative example.

Referring to FIG. 2, the display module 200 may include a structure in which a touch screen 230, a panel 220, a substrate 210, a polarizing film 240, and an adhesive member 250 are stacked. The structure of the display module 200 illustrated in FIG. 2 illustrates some of various components included in the display module 200, and the display module 200 may include other components in addition to the components illustrated in FIG. 2. Also, in some cases, some of the components illustrated in FIG. 2 may be omitted.

According to various embodiments, the substrate 210 may be a base on which various components of the display module 200 are stacked. The substrate 210 may be formed of various materials. For example, the substrate 210 may be formed of a glass material or a flexible material such as polyimide (PI) or polyethylene terephthalate (PET).

According to various embodiments, the panel 220 may be disposed on at least a portion of the substrate 210. The panel 220 may include a plurality of pixels. A pixel may refer to a minimum unit for converting information into light according to an electrical signal. The pixels may emit light in a color of red, green, blue, or a combination thereof according to a signal from the DDIC. A pixel may include at least one light emitting device (e.g., an organic light emitting diode (OLED)) and a thin film transistor (TFT). A light emitting element may refer to an electric element that emits light according to an electrical signal. The TFT may adjust the brightness of the light emitting element by adjusting the amount of current applied to the light emitting element according to the electric signal transmitted to the TFT.

According to various embodiments, the polarizing film 240 may be disposed on at least a partial area on the panel 220. The polarization film 240 may prevent reflection of light incident on the display module 200 from the outside.

According to various embodiments, the touch screen 230 may be disposed on the polarizing film 240. The touch screen 230 enables the display module 200 to recognize a touch input. For example, the touch screen 230 may operate in a capacitive touch method that detects a change in an electrical signal caused by a user's skin contact. The touch screen 230 may include an electrode made of a transparent material (e.g., transparent conducting oxide (TCO), carbon material, or conducting polymer). For example, the touch screen 230 may include a transparent electrode made of indium tin oxide (ITO) The transparent electrode included in the touch screen 230 may be disposed on a touchable portion to form a pattern.

According to various embodiments, the adhesive member 250 for fixing the polarizing film 240 and the touch screen 230 may be disposed between the polarizing film 240 and the touch screen 230. The adhesive member 250 may be formed of a material having high light transmittance. For example, the adhesive member 250 may be an optical clear adhesive (OCA).

According to various embodiments, a first flexible printed circuit board 201 may be electrically connected to the touch screen 230. In one embodiment, a touch integrated circuit (IC) 222 for controlling the touch screen 230 may be disposed on the first flexible printed circuit board 201.

According to various embodiments, a second flexible printed circuit board 202 may be electrically connected to the panel 220. In one embodiment, a display driver IC (DDIC) 221 may be disposed on the second flexible printed circuit board 202.

According to various embodiments, a third flexible printed circuit board 203 may be electrically connected to a main printed circuit board of an electronic device.

Figure 3A:
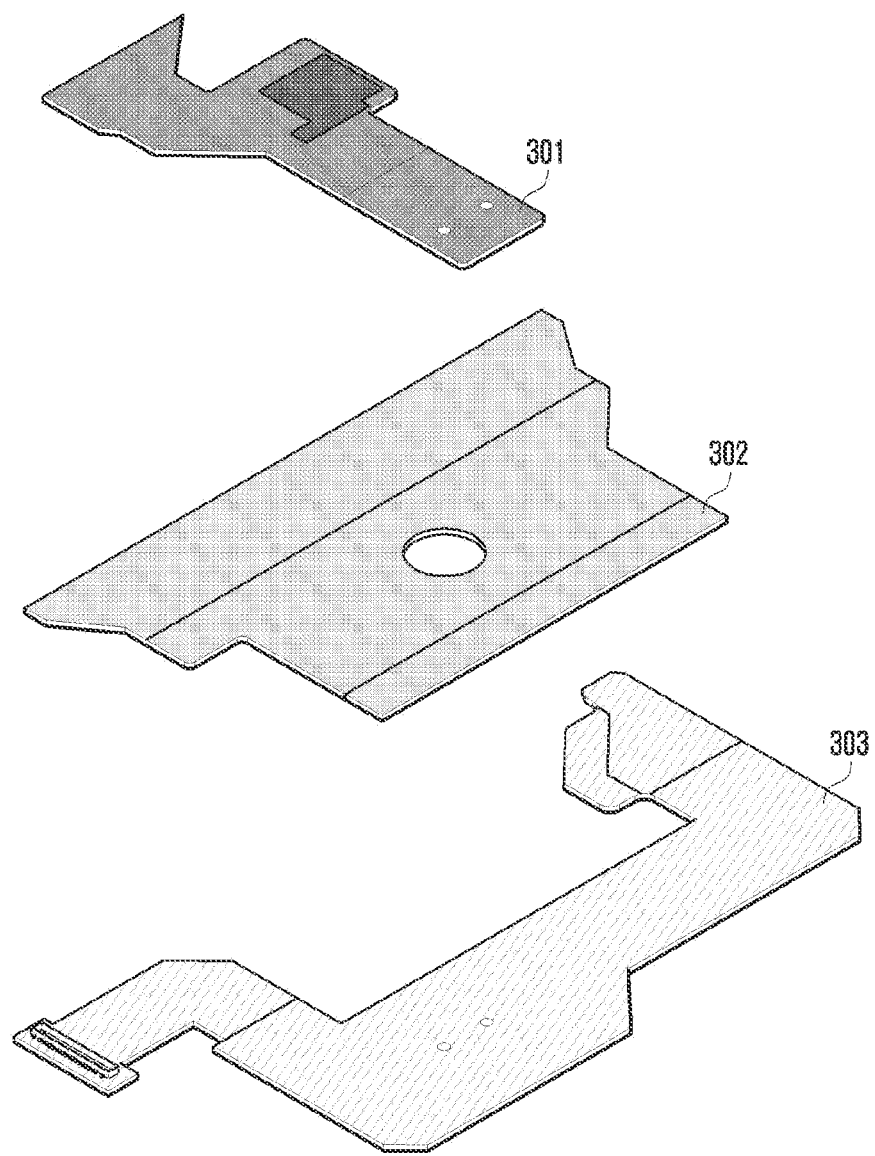
FIG. 3A is an exploded perspective view of a plurality of flexible printed circuit boards included in a display module according to an embodiment of the disclosure.
Figure 3B:
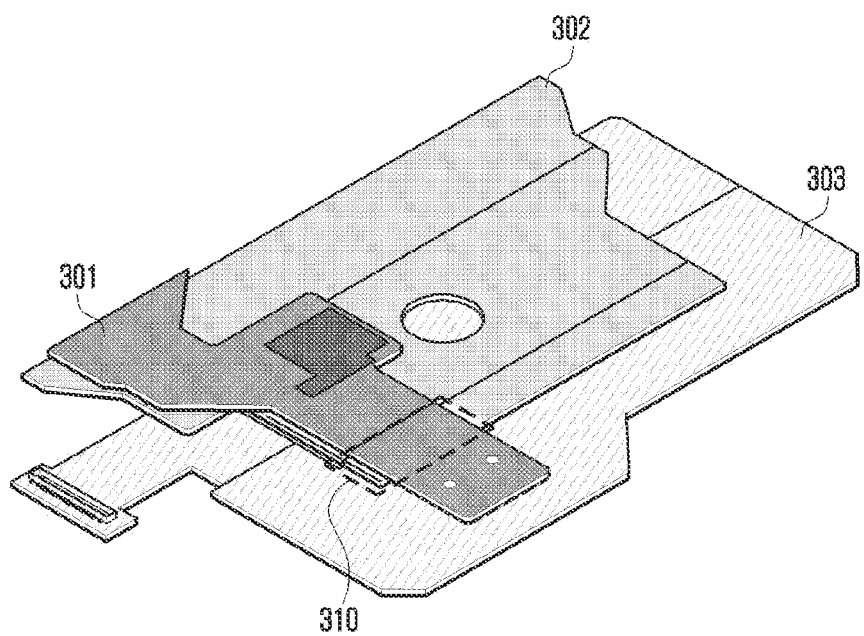
FIG. 3B is a perspective view of a state in which the plurality of flexible printed circuit boards illustrated in FIG. 3A is connected according to an embodiment of the disclosure.

FIG. 3A is an exploded perspective view of a plurality of flexible printed circuit boards included in a display module according to an embodiment of the disclosure. FIG. 3B is a perspective view of a state in which the plurality of flexible printed circuit boards illustrated in FIG. 3A is connected according to an embodiment of the disclosure.

According to various embodiments, a display module (e.g., display module 200 in FIG. 2) may include a plurality of flexible printed circuit boards 301, 302, and 303. For example, as illustrated in FIG. 3A, the display module may include a first flexible printed circuit board 301, a second flexible printed circuit board 302 and a third flexible printed circuit board 303.

According to various embodiments, the first flexible printed circuit board 301, the second flexible printed circuit board 302, and the third flexible printed circuit board 303 may be disposed in a stack structure in a state where the display module is disposed in an electronic device. For example, as illustrated in FIG. 3A, the third flexible printed circuit board 303, the second flexible printed circuit board 302, and the first flexible printed circuit board 301 may be sequentially stacked from the bottom.

According to various embodiments, as illustrated in FIG. 3B, an overlapping area in which the first flexible printed circuit board 301, the second flexible printed circuit board 302, and the third flexible printed circuit board 303 all overlap may exist. Also, the first flexible printed circuit board 301, the second flexible printed circuit board 302, and the third flexible printed circuit board 303 may be electrically connected. In one embodiment, the first flexible printed circuit board 301, the second flexible printed circuit board 302, and the third flexible printed circuit board 303 may be electrically connected in an overlapping area 310. Electrical connection can be made in a variety of ways. For example, the first flexible printed circuit board 301, the second flexible printed circuit board 302, and the third flexible printed circuit board 303 may be electrically connected through a soldering method, a socket method, and a clip method.

Figure 4:
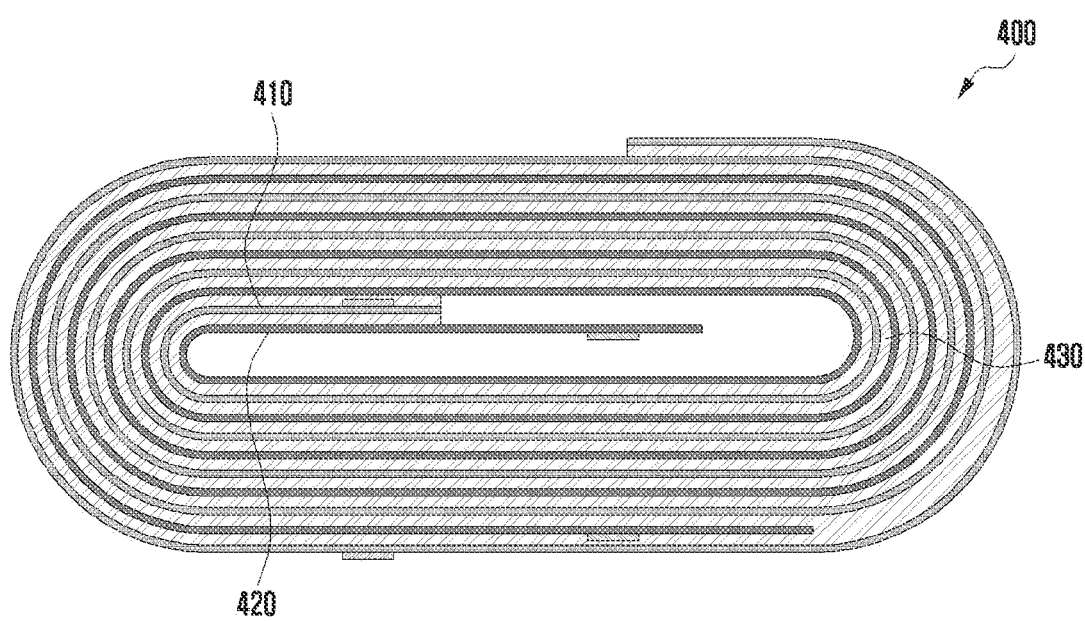
FIG. 4 is a cross-sectional view of a jelly roll structure of a battery included in an electronic device according to an embodiment of the disclosure.

FIG. 4 is a cross-sectional view of a jelly roll structure of a battery included in an electronic device according to an embodiment of the disclosure.

An electronic device (e.g., electronic device 101 in FIG. 1) according to various embodiments of the disclosure may include a battery (e.g., battery 189 in FIG. 1) that supplies power to various electronic components (e.g., a processor (e.g., processor 120 in FIG. 1)), a memory (e.g., memory 130 in FIG. 1), and a display (e.g., display module 160 in FIG. 1). The battery may be, for example, a Li-ion battery.

A lithium ion battery is a battery that can be charged using an external power source. Lithium-ion batteries are widely used in mobile electronic devices because of their high energy density, excellent preservation, and long life cycle. In addition, in the case of the lithium ion polymer battery, since it uses a solid or gel type electrolyte, unlike other batteries using a liquid electrolyte, the possibility of leakage of an electrolyte material is remarkably low.

According to various embodiments, the battery may include a jelly roll 400. The jelly roll 400 may include a structure in which a cathode plate 410 and an anode plate 420 are overlapped and wound together. The cathode plate 410 and the anode plate 420 may be wound together with a separator 430 therebetween. According to another embodiment, the battery may include a stack type electrode assembly including a structure in which the cathode and anode plates are stacked. The cathode plate 410 may refer to an electrode from which electrons flow. Since a chemical reaction in which electrons are lost occurs in the cathode plate 410, it may be understood as an electrode in which an oxidation reaction is performed. A cathode active material for cathode activation may be coated on at least one surface of the cathode plate 410. The anode plate 420 may refer to an electrode in which electrons flow. Since a chemical reaction to obtain electrons occurs in the anode plate 420, it can be understood as an electrode in which a reduction reaction occurs. An anode active material for anode activation may be coated on at least one surface of the anode plate 420. As such, current may be generated through an oxidation-reduction reaction between the cathode plate 410 and the anode plate 420 disposed with the separator 430 interposed therebetween.

According to various embodiments, the separator 430 disposed between the cathode plate 410 and the anode plate 420 may function as an electrolyte in a battery. The separator 430 may be made of a porous polymer material. For example, the separator 430 may include a porous polyolefin membrane, polyvinylidene fluoride-hexafluoropropylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile styrene butadiene copolymer, polyimide, polyethylene terephthalate, polybutylene terephthalate, polyester, polyacetal, polyamide, polyether ether ketone, polyether sulfone, polyphenylene oxide, polyphenylene sulfide, polyethylene naphthalene, nonwoven membrane, membrane having a porous web structure or a combination thereof. The separator 430 may include inorganic particles bound to either surface of both surfaces thereof.

Figure 5A:
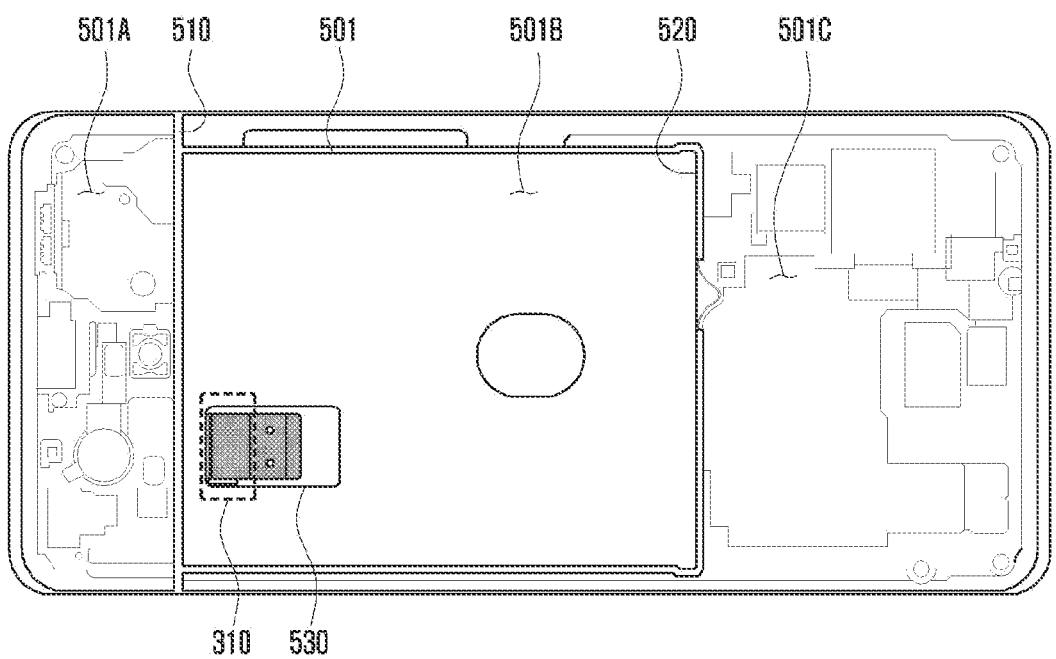
FIG. 5A is a plan view of a frame and a display module coupled to the frame according to an embodiment of the disclosure.
Figure 5B:
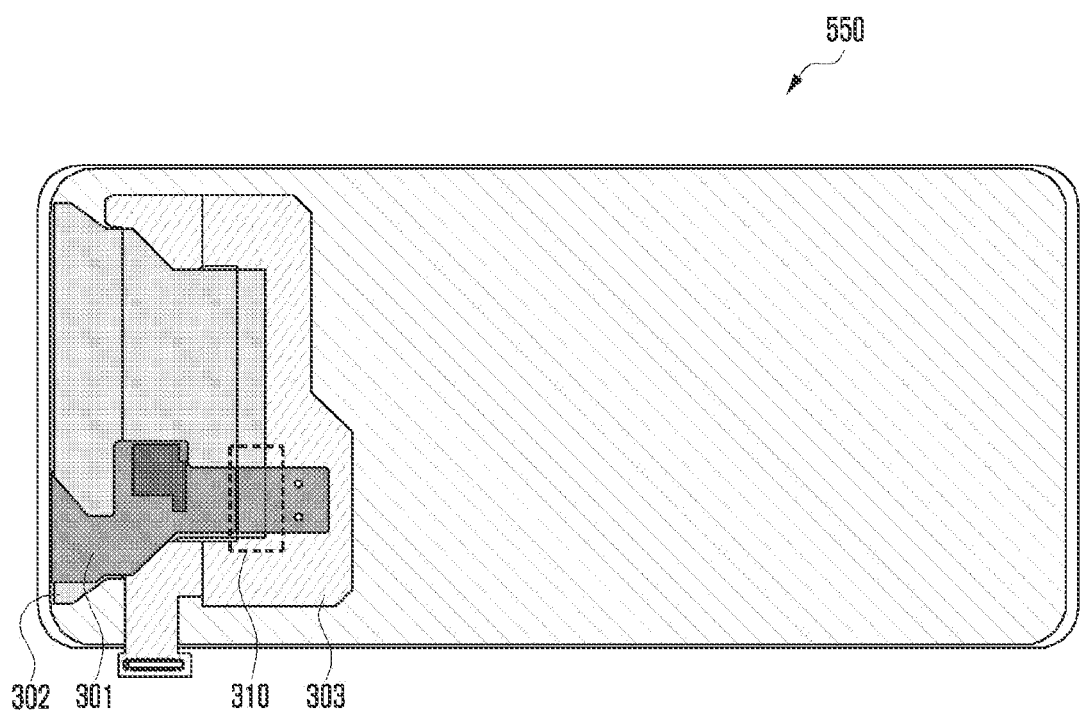
FIG. 5B is a plan view of a display module according to an embodiment of the disclosure.

FIG. 5A is a plan view of a frame and a display module coupled to the frame according to an embodiment of the disclosure. FIG. 5B is a plan view of a display module according to an embodiment of the disclosure.

Figure 6A:
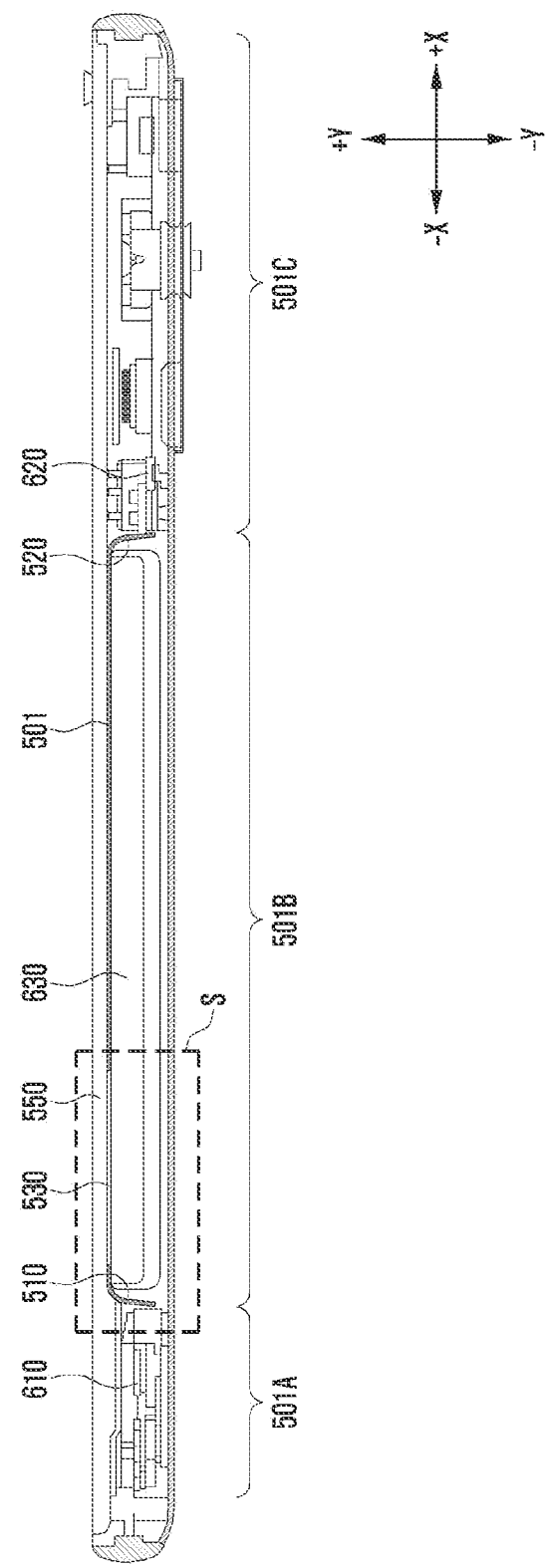
FIG. 6A is a cross-sectional side view of an electronic device according to an embodiment of the disclosure.
Figure 6B:
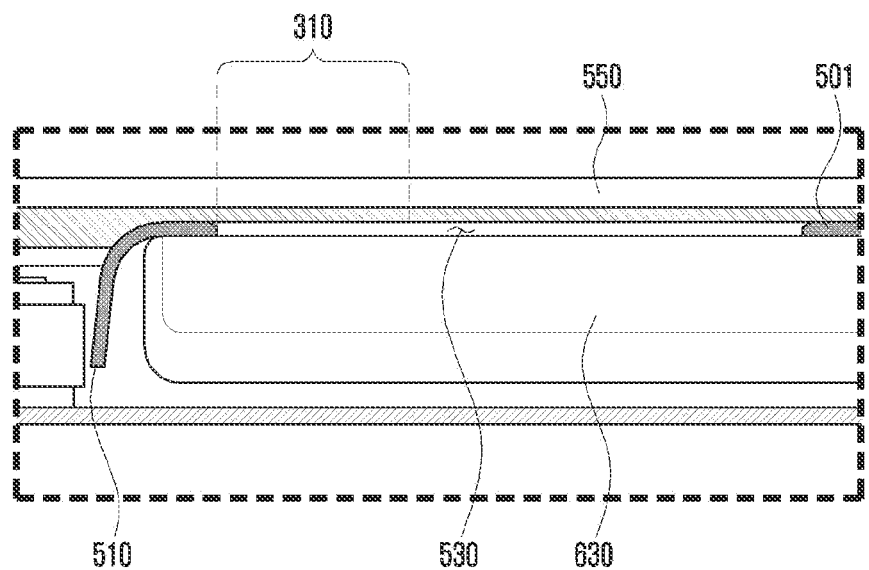
FIG. 6B is an enlarged view of portion S illustrated in FIG. 6A according to an embodiment of the disclosure.
Figure 6C:
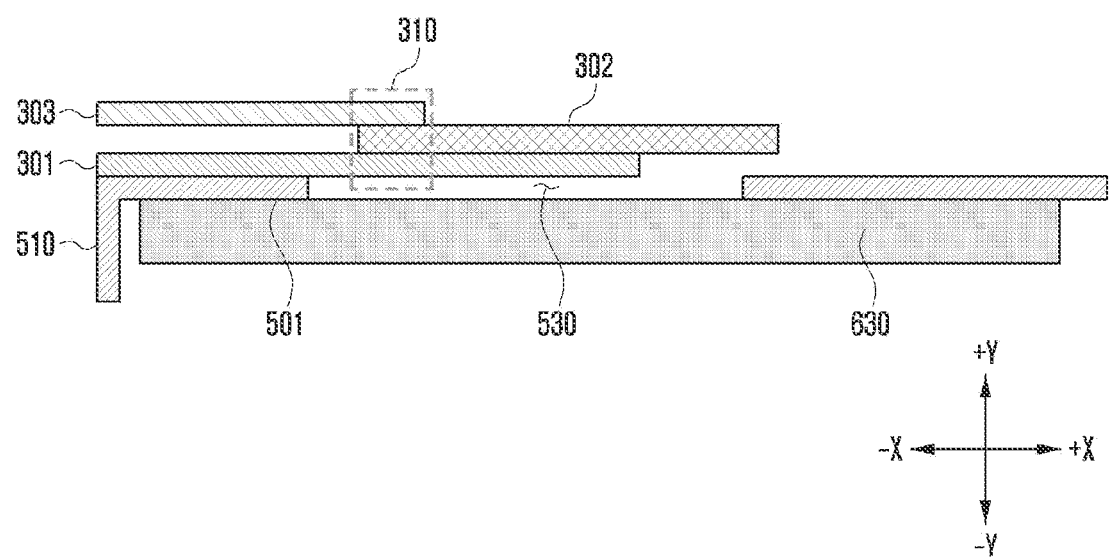
FIG. 6C is a schematic view of some of the components illustrated in FIG. 6B according to an embodiment of the disclosure.

FIG. 6A is a cross-sectional side view of an electronic device according to an embodiment of the disclosure. FIG. 6B is an enlarged view of portion S illustrated in FIG. 6A according to an embodiment of the disclosure. FIG. 6C is a schematic diagram of some of the components illustrated in FIG. 6B according to an embodiment of the disclosure. In the following description, components identical or similar to those of FIGS. 3A and 3B will be described using the same reference numerals.

According to various embodiments, an electronic device (e.g., the electronic device 101 in FIG. 1) may include a frame 501 supporting various components included in the electronic device. The frame 501 may be formed of various materials. For example, the frame 501 may be formed of a metal material or a synthetic resin material.

According to various embodiments, the frame 501 may be partitioned into a first area 501A, a second area 501B, and a third area 501C by a first partition wall 510 and a second partition wall 520. Here, the areas are arbitrarily divided for explanation of the disclosure, and each area may not be visually distinguished. Also, areas may be connected to each other in some sections.

According to various embodiments, the first partition wall 510 and the second partition wall 520 may protrude from the frame 501 in a first direction (e.g., the −Y direction in FIG. 6A). In one embodiment, the first partition wall 510 and the second partition wall 520 may be integrally formed with the frame 501 using the same material as the frame 501. In another embodiment, the first partition wall 510 and the second partition wall 520 may be formed separately from the frame 501 and disposed on the frame 501.

According to various embodiments, the second area 501B may be an area divided by the first partition wall 510 and the second partition wall 520. A battery 630 of an electronic device may be disposed in the second area 501B. The battery 630 disposed in the second area 501B may be fixed to the second area 501B by the first partition wall 510 and the second partition wall 520. For example, even when an impact is applied to the electronic device due to various factors, the first partition wall 510 and the second partition wall 520 stably support the battery 630 to prevent the battery 630 from being separated from the second area 501B.

According to various embodiments, as illustrated in FIG. 6A, a first printed circuit board 610 of an electronic device may be disposed in the first area 501A. A second printed circuit board 620 of an electronic device may be disposed in the third area 501C. On the first printed circuit board 610 disposed in the first area 501A, an interface integrated circuit (IC) that may be electrically connected to an interface port (e.g., a charging port, a USB connection port, an earphone port) for connection with an external electronic device may be disposed. A processor, memory, power management circuit, etc. of an electronic device may be disposed on the second printed circuit board 620 disposed in the third area 501C. In addition, electronic components serving various functions that may be performed through an electronic device may be disposed on the first printed circuit board 610 and the second printed circuit board 620. The first printed circuit board 610 and the second printed circuit board 620 may be electrically connected by a connection member (e.g., connection member 710 in FIG. 7).

Referring to FIG. 6A, a display module 550 of an electronic device may be disposed in the frame 501 in a second direction (e.g., +Y direction in FIG. 6A) opposite to the first direction.

Referring to FIGS. 5A and 5B, the overlapping area 310 of the plurality of flexible printed circuit boards 301, 302, and 303 of the display module 550 may be disposed on the second area 501B spaced apart from the first partition wall 510 on which the battery 630 is disposed. As the size of the second flexible printed circuit board 302 on which the DDIC (e.g., DDIC 221 in FIG. 2) is disposed increases to drive the display module 550 at high speed, the position of the overlapping area 310 where the plurality of printed circuit boards 301, 302, and 303 included in the display module 550 overlaps may be moved to the central portion of the frame 501. In the case that the first partition wall 510 formed by protruding from the frame 501 and the overlapping area 310 are disposed at a position where they overlap each other, the thickness of the electronic device may increase, and the plurality of flexible printed circuit boards 301, 302, and 303 may be damaged due to the interference between the first partition wall 510 and the overlapping area 310. In order to avoid this, in the case that a groove for compensating for the thickness of the overlapping area 310 is formed in the first partition wall 510, the groove becomes a weak point of the first partition wall 510 supporting the battery 630 including a jelly roll (e.g., the jelly roll 400 in FIG. 4), and a problem in that the battery 630 may be damaged by an external impact may occur. In the electronic device according to various embodiments of the disclosure, the above mentioned problem may be solved by disposing the overlapping area 310 in which the plurality of printed circuit boards 301, 302, and 303 overlaps spaced apart from the first partition wall 510.

Referring to FIGS. 5A, 6B, and 6C, in the frame 501, an opening 530 may be formed on a portion of the frame 501 facing the overlapping area 310 of the plurality of flexible printed circuit boards 301, 302, and 303. The opening 530 formed in the frame 501 may compensate for the thickness that may be increased by the overlapping area 310. In addition, the opening 530 provides a space through which the overlapping area 310 communicates with each other, thereby preventing the overlapping area 310 from being damaged by an external impact. The size of the opening 530 may be greater than or equal to the size of the overlapping area 310. For example, as illustrated in FIGS. 5A, 6B, and 6C, the size of the opening 530 may be larger than that of the overlapping area 310. In another embodiment, a portion of the frame 501 facing the overlapping area 310 may be formed thinner than other portions. As the thickness of the portion facing the overlapping area is formed thin, an increase in the thickness of an electronic device due to the overlapping area may be compensated for.

Figure 7:
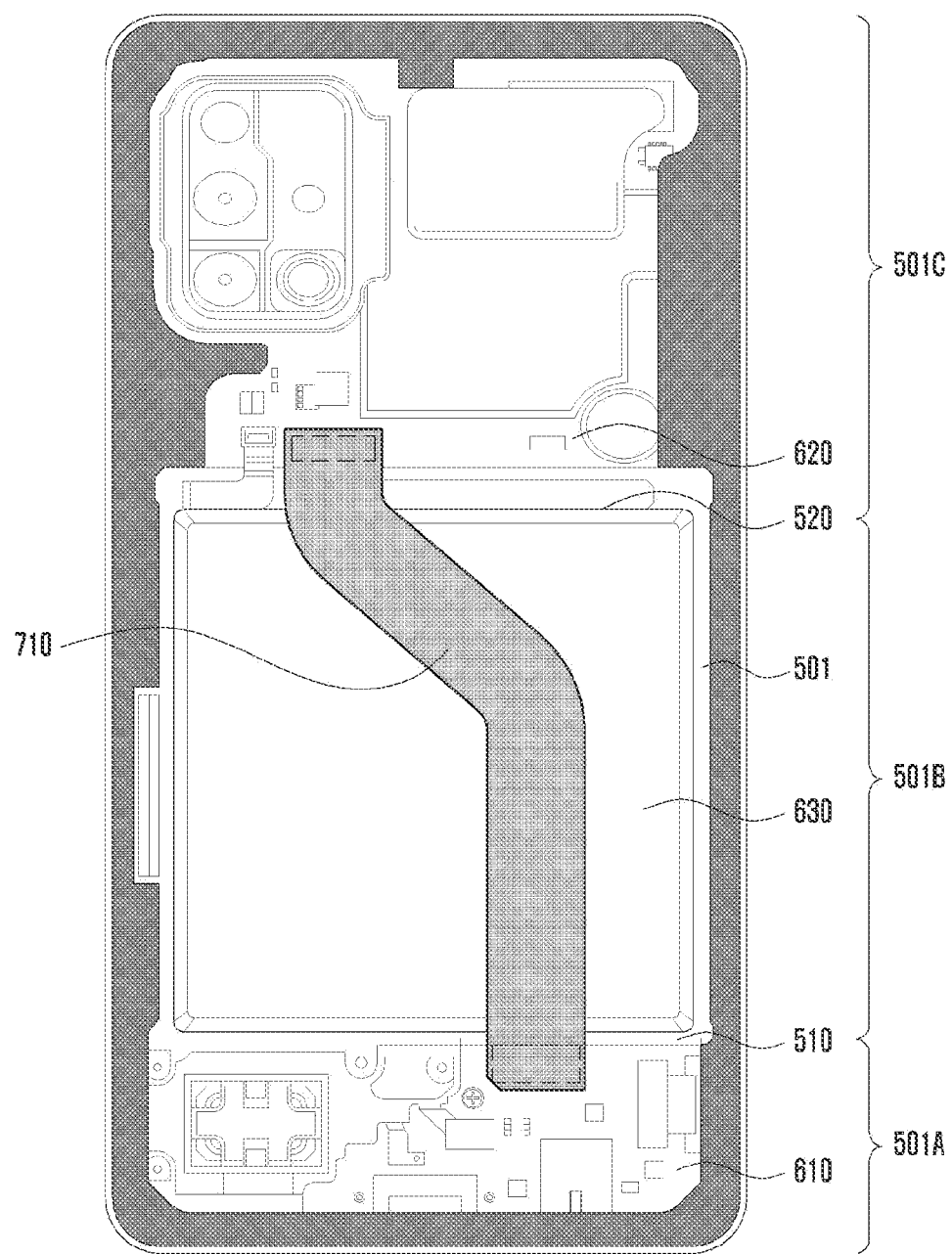
FIG. 7 is a view for explaining a disposition relationship of the first printed circuit board, second printed circuit board, and battery of an electronic device according to an embodiment of the disclosure.

FIG. 7 is a view for explaining a disposition relationship of the first printed circuit board, second printed circuit board, and battery of an electronic device according to an embodiment of the disclosure. In the following description, the same reference numerals are used for components identical or similar to those of FIGS. 6A to 6C.

Referring to FIG. 7, according to various embodiments, the first printed circuit board 610 may be disposed in the first area 501A of the frame 501, and the second printed circuit board 620 may be disposed in the third area 501C. The battery 630 may be disposed in the second area 501B between the first area 501A and the third area 501C. A connection member 710 may electrically connect the first printed circuit board 610 and the second printed circuit board 620. For example, the connection member 710 may be a flexible printed circuit board.

According to various embodiments, one end of the connection member 710 is connected to the first printed circuit board 610 and extends through the second area 501B where the battery 630 is disposed, and the other end may be electrically connected to the second printed circuit board 620.

According to various embodiments, a portion of the connection member 710 passing through the second area 501B may pass through the first surface of the battery 630 or may pass through the second surface opposite to the first surface.

In the above, although a plurality of flexible printed circuit boards (e.g., the flexible printed circuit boards 301, 302, and 303 in FIG. 3A) included in a display module (e.g., display module 200 in FIG. 2) have been described as three, the structure disclosed herein can be applied even in the case that the number of flexible printed circuit boards included in the display module is two, four, or more.

An electronic device according to various embodiments of the disclosure may include a frame, a first partition wall formed so as to protrude from the frame in a first direction and dividing the frame into a first area and a second area, a second partition wall portion formed so as to protrude from the frame in the first direction and dividing the frame into the second area and a third area, a first printed circuit board disposed in the first area of the frame, a battery disposed in the second area of the frame, a second printed circuit board disposed in the third area of the frame, and a display module including at least two flexible printed circuit boards and disposed on the frame in a second direction opposite to the first direction. The flexible printed circuit boards of the display module may include an overlapping area in which at least some areas are overlapped, the overlapping area may be disposed in the second area spaced apart from the first partition wall portion, and in the frame, an opening may be formed in a portion facing the overlapping area of the flexible printed circuit boards of the display module.

In addition, the thickness of the portion facing the overlapping area of the flexible printed circuit boards of the display module may be thinner than other portions of the frame.

In addition, the opening formed in the frame may be formed in the second area at a position spaced apart from the first partition wall.

In addition, the flexible printed circuit boards of the display module may include a first flexible printed circuit board electrically connected to a touch screen, a second flexible printed circuit board electrically connected to a panel on which a light emitting element is disposed, and a third flexible printed circuit board connecting the second flexible printed circuit board and the first flexible printed circuit board, and the first flexible printed circuit board, the second flexible printed circuit board and the third flexible printed circuit board may be electrically connected to each other.

In addition, the overlapping area of the flexible printed circuit boards of the display module may be an area in which the first flexible printed circuit board, the second flexible printed circuit board, and the third flexible printed circuit board all overlap.

In addition, a display driver IC (DDIC) may be disposed on the second flexible printed circuit board of the display module.

In addition, the battery may include a jelly roll formed by winding an anode plate, a cathode plate, and a separator disposed between the anode plate and the cathode plate.

In addition, the electronic device may further include a connection member in which at least a portion electrically connects the first printed circuit board and the second printed circuit board through the battery.

An electronic device according to various embodiments of the disclosure may include a frame, a first partition wall formed so as to protrude from the frame in a first direction and dividing the frame into a first area and a second area, a first printed circuit board disposed on the first area of the frame, a battery disposed on the second area of the frame, and a display module including at least two flexible printed circuit boards and disposed on the frame in a second direction opposite to the first direction. The flexible printed circuit boards of the display module may include an overlapping area in which at least some areas are overlapped, the overlapping area may be disposed in the second area spaced apart from the first partition wall portion, and in the frame, an opening may be formed in a portion facing the overlapping area of the flexible printed circuit boards of the display module.

In addition, the thickness of the portion facing the overlapping area of the flexible printed circuit boards of the display module may be thinner than other portions of the frame.

In addition, the opening formed in the frame may be formed in the second area at a position spaced apart from the first partition wall.

In addition, the flexible printed circuit boards of the display module may include a first flexible printed circuit board electrically connected to a touch screen, a second flexible printed circuit board electrically connected to a panel on which a light emitting element is disposed, and a third flexible printed circuit board connecting the second flexible printed circuit board and the first flexible printed circuit board, and the first flexible printed circuit board, the second flexible printed circuit board and the third flexible printed circuit board may be electrically connected to each other.

In addition, the overlapping area of the flexible printed circuit boards of the display module may be an area in which the first flexible printed circuit board, the second flexible printed circuit board, and the third flexible printed circuit board all overlap.

In addition, a display driver IC (DDIC) may be disposed on the second flexible printed circuit board of the display module.

In addition, the battery may include a jelly roll formed by winding an anode plate, a cathode plate, and a separator disposed between the anode plate and the cathode plate.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a frame configured to support at least one component of the electronic device, the frame being partitioned into at least a first area and a second area;
   a battery disposed on a first side of the second area of the frame;
   an opening formed in the second area where the battery is located;
   a display disposed at a second side, opposite to the first side, of the frame; and
   flexible printed circuit boards (FPCBs) at least partially disposed between the display and the frame,
   wherein a first FPCB of the FPCBs and a second FPCB of the FPCBs at least partially overlap between the display and the frame, and
   wherein an overlap portion of the first FPCB and the second FPCB is at least partially disposed at a location corresponding to the opening.

2. The electronic device of claim 1, further comprising:
   a first partition wall portion protruding from the first side of the frame and dividing the frame into the first area and the second area,
   wherein the overlap portion is spaced apart from the first partition wall portion.

3. The electronic device of claim 2, further comprising:
   a second partition wall portion protruding from the first side of the frame and dividing the frame into the second area and a third area.

4. The electronic device of claim 3, further comprising:
   a first printed circuit board disposed in the first area of the frame; and
   a second printed circuit board disposed in the third area of the frame.

5. The electronic device of claim 4, further comprising:
   a connection member in which at least a portion electrically connects the first printed circuit board and the second printed circuit board through the battery.

6. The electronic device of claim 4,
   wherein the first FPCB is electrically connected to a touch screen, and
   wherein the second FPCB is electrically connected to a panel on which a light emitting element is disposed.

7. The electronic device of claim 6,
   wherein the FPCBs include a third FPCB connecting the second FPCB and the first FPCB, and
   wherein the first FPCB, the second FPCB, and the third FPCB are electrically connected to each other.

8. The electronic device of claim 7, wherein the overlap portion of the first FPCB and the second FPCB comprises an area in which the first FPCB, the second FPCB, and the third FPCB all overlap.

9. The electronic device of claim 6, wherein a display driver integrated circuit (DDIC) is disposed on the second FPCB of the display.

10. The electronic device of claim 3, wherein, in the frame, a thickness of a portion facing the overlap portion of the first FPCB and the second FPCB is thinner than other portions of the frame.

11. The electronic device of claim 3, wherein the opening formed in the frame is formed in the second area at a position spaced apart from the first partition wall portion.

12. The electronic device of claim 3, wherein a size of the opening is greater than or equal to a size of the overlap portion.

13. The electronic device of claim 3,
   wherein the battery is fixed to the second area by the first partition wall portion and the second partition wall portion, and
   wherein the first partition wall portion extends along a first edge of the battery and the second partition wall portion extends along a second edge of the battery opposite to the first edge of the battery.

14. The electronic device of claim 1, wherein, in the frame, a thickness of a portion facing the overlap portion of the first FPCB and the second FPCB is thinner than other portions of the frame.

15. The electronic device of claim 1, wherein the opening formed in the frame is formed in the second area at a position spaced apart from a first partition wall portion.

16. The electronic device of claim 1,
   wherein the first FPCB is electrically connected to a touch screen, and
   wherein the second FPCB is electrically connected to a panel on which a light emitting element is disposed.

17. The electronic device of claim 16, wherein a display driver integrated circuit (DDIC) is disposed on the second FPCB of the display.

18. The electronic device of claim 1,
   wherein the FPCBs include a third FPCB connecting the second FPCB and the first FPCB, and
   wherein the first FPCB, the second FPCB, and the third FPCB are electrically connected to each other.

19. The electronic device of claim 18, wherein the overlap portion of the FPCBs comprises an area in which the first FPCB, the second FPCB, and the third FPCB all overlap.

20. An electronic device comprising:
a frame configured to support at least one component of the electronic device, the frame including a first area and a second area;
a battery disposed on a first side of the second area of the frame;
an opening formed in the second area where the battery is located;
a display disposed at a second side, opposite to the first side, of the frame;
a first flexible printed circuit board (FPCB) at least partially disposed between the display and the frame; and
a second FPCB at least partially disposed between the display and the frame,
wherein the first FPCB includes a first portion at least partially overlapping with the second FPCB, and
wherein the first portion is at least partially disposed at a location corresponding to the opening.

* * * * *